(12) United States Patent
Tallman et al.

(10) Patent No.: US 11,789,770 B2
(45) Date of Patent: Oct. 17, 2023

(54) SYSTEMS AND METHODS FOR CREATING SURROGATE MODELS

(71) Applicant: General Electric Company, Schenectady, NY (US)

(72) Inventors: James Albert Tallman, Glenville, NY (US); Eric James Tucker, West Glenville, NY (US); Vincent Michael Russo, Loudonville, NY (US); Andrew Louis Gallo, Jr., Duanesburg, NY (US); Richard Brownell Arthur, Ballston Spa, NY (US); Jeffrey Michael Iannotti, Ballston Lake, NY (US); Peter Matthew Schmid, Howes Cave, NY (US); Adam Franklin Stevenson, Clifton Park, NY (US); David Charles Harry Ward, Delmar, NY (US); Douglas Evan King, Colonie, NY (US)

(73) Assignee: General Electric Company, Schenectady, NY (US)

( * ) Notice: Subject to any disclaimer, the term of this patent is extended or adjusted under 35 U.S.C. 154(b) by 327 days.

(21) Appl. No.: 16/877,851

(22) Filed: May 19, 2020

(65) Prior Publication Data
US 2021/0365286 A1    Nov. 25, 2021

(51) Int. Cl.
*G06F 9/46*    (2006.01)
*G06F 9/48*    (2006.01)
(Continued)

(52) U.S. Cl.
CPC .......... *G06F 9/4843* (2013.01); *G06F 9/5038* (2013.01); *G06F 16/25* (2019.01);
(Continued)

(58) Field of Classification Search
CPC .. G06F 9/4843; G06F 9/5038; G06F 9/44505; G06F 2209/482
See application file for complete search history.

(56) References Cited

U.S. PATENT DOCUMENTS

| 6,199,068 B1 | 3/2001 | Carpenter |
| 6,662,357 B1 | 12/2003 | Bowman-Amuah |

(Continued)

FOREIGN PATENT DOCUMENTS

| WO | 2017138786 A1 | 8/2017 |
| WO | 2018125250 A1 | 7/2018 |
| WO | 2019040398 A1 | 2/2019 |

OTHER PUBLICATIONS

Castrillon et al., "A Hardware/Software Stack for Heterogeneous Systems", IEEE Transactions on Multi-Scale Computing Systems, vol. 4, Issue No. 3, pp. 243-259, Nov. 9, 2017.
(Continued)

*Primary Examiner* — Diem K Cao
(74) *Attorney, Agent, or Firm* — Armstrong Teasdale LLP

(57) ABSTRACT

A system for creating surrogate models is provided. The system includes a user computing device including a user interface, a database, and a processor. The processor is configured to receive, from the user computing device, a workflow request, determine at least one application in the database required to complete the workflow request, retrieve, from the database, the at least one application and meta-data associated with the at least one application, and determine that a user has proper tenancies to use the at least one application. The processor is further configured to execute, using the at least one application on an external computing device, a workflow associated with the workflow request based at least in part on the meta-data, generate, based on execution of the workflow request, new meta-data
(Continued)

associated with the at least one application, and transmit the new meta-data to the database.

20 Claims, 4 Drawing Sheets

(51) Int. Cl.
*G06N 20/00* (2019.01)
*G06F 16/25* (2019.01)
*G06F 9/50* (2006.01)
*G06F 9/445* (2018.01)

(52) U.S. Cl.
CPC ......... *G06N 20/00* (2019.01); *G06F 9/44505* (2013.01); *G06F 2209/482* (2013.01)

(56) References Cited

U.S. PATENT DOCUMENTS

| | | | |
|---|---|---|---|
| 7,395,536 B2 | 7/2008 | Verbeke et al. | |
| 7,606,868 B1 | 10/2009 | Le et al. | |
| 7,692,861 B2* | 4/2010 | Robinson | G02B 27/149 |
| | | | 359/489.08 |
| 7,702,725 B2 | 4/2010 | Erickson et al. | |
| 8,555,014 B1* | 10/2013 | Redone, Jr. | G06F 9/468 |
| | | | 711/170 |
| 9,076,311 B2 | 7/2015 | Rachamadugu | |
| 9,286,399 B2 | 6/2016 | Pingree | |
| 9,412,071 B2 | 8/2016 | Burris et al. | |
| 9,712,634 B2 | 7/2017 | Ang et al. | |
| 10,142,417 B2 | 11/2018 | Hebert et al. | |
| 10,897,466 B2* | 1/2021 | Sisley | H04L 63/08 |
| 2016/0162819 A1 | 6/2016 | Hakman et al. | |
| 2016/0224381 A1* | 8/2016 | Farhan | G06F 9/5044 |
| 2016/0350079 A1 | 12/2016 | Louie et al. | |
| 2017/0078373 A1 | 3/2017 | Hayavadana | |
| 2017/0103167 A1 | 4/2017 | Shah | |
| 2017/0330152 A1 | 11/2017 | Loi | |
| 2018/0171761 A1 | 6/2018 | Schneider et al. | |
| 2018/0210901 A1 | 7/2018 | Depaoli et al. | |
| 2019/0324893 A1* | 10/2019 | Vaishnav | G06F 11/3664 |

OTHER PUBLICATIONS

Andrade et al.,, "A Review on Software Architectures for Heterogeneous Platforms", 2018 25th Asia-Pacific Software Engineering Conference (APSEC), pp. 1-10, Nara, Japan, May 5, 2019.

Carapuat et al., "Filtering and Routing Multilingual Documents for Translation" 2012 IEEE Symposium on Computational Intelligence for Security and Defense Applications, Canada, pp. 1-7, Aug. 31, 2012.

T.B. Nguyen, "Metadata Integration Framework for Managing Forest Heterogeneous Information Resources", 15th International Workshop on Database and Expert Systems Applications, Sep. 20, 2004, pp. 586-591, Zaragoza, Spain.

Stefan Hoermann, et al., "Resource Centre—A Digital Learning Object Repository with an integrated Authoring Tool Set", Association for the Advancement of Computing Education (AACE), Jun. 27, 2005, Waynesville, North Carolina.

* cited by examiner

SYSTEMS AND METHODS FOR CREATING SURROGATE MODELS

BACKGROUND

The field of the disclosure relates generally to a machine learning process used to create "surrogate" models of industrial assets, and more specifically, to a digital repository for use in conjunction with the machine learning process, and a computing system associated therewith.

An enterprise may create one or more digital models of an industrial asset. For example, an enterprise might create physics-based models associated with a gas turbine engine to predict maintenance requirements, or future performance, for example. However, execution of the physics-based models might not be practical in connection with a substantially real-time process (e.g., execution may take too long to execute). To address this issue, a machine learning process may be used to create a "surrogate" digital model of the industrial asset. When creating the surrogate digital model, a subject matter expert familiar with the industrial asset and the physics-based model may manually select appropriate solution points, map physics-based model inputs and outputs, and format and translate data as appropriate, for example. Such an approach can be a time-consuming, expensive, and error prone process.

Applications, or apps, are used by computing devices in computing systems to complete a wide variety of tasks. Completing one particular task or workflow often requires use of multiple applications in a computing system including a plurality of computing devices. A set of applications used to complete a task is often referred to as a workflow. Many of these applications function and run independent from one another. Despite running independent from one another, outputs from one application are often required as inputs to other applications in a workflow. As such, a labor-intensive process is required to organize the applications, configure appropriate computing devices in a computing system to use the applications, and oversee execution of the workflow as a whole. Further, if one user is involved in the labor-intensive process described above, another user trying to operate the same workflow may not be able to complete the same workflow by reusing the applications in the same way, resulting in additional costs and time required to operate the same system. Thus, systems and methods are desired for a database, or digital repository, to expedite execution of workflows for use in conjunction with a machine learning process and computing system associated therewith.

BRIEF DESCRIPTION

In one aspect, a system for creating surrogate models is provided. The system includes a user computing device including a user interface, a database, and a processor. The processor is configured to receive, from the user computing device, a workflow request, determine at least one application in the database required to complete the workflow request, retrieve, from the database, the at least one application and meta-data associated with the at least one application, and determine that a user has proper tenancies to use the at least one application. The processor is further configured to execute, using the at least one application on an external computing device, a workflow associated with the workflow request based at least in part on the meta-data, generate, based on execution of the workflow request, new meta-data associated with the at least one application, and transmit the new meta-data to the database.

In another aspect, a computer-implemented method of creating surrogate models using a surrogate model computing (SMC) system, including a processor communicatively coupled to a database, is provided. The method includes receiving, from a user computing device, a workflow request, determining, by the processor, at least one application in a database required to complete the workflow request, retrieving, from the database, the at least one application and meta-data associated with the at least one application, and determining, by the processor, that a user has proper tenancies to use the at least one application. The method also includes executing, by the processor, using the at least one application on an external computing device, a workflow associated with the workflow request based at least in part on the meta-data, generating, by the processor, based on execution of the workflow request, new meta-data associated with the at least one application, and transmitting, by the processor, the new meta-data to the at least one database.

In yet another aspect, a non-transitory computer-readable storage media having computer-executable instructions embodied thereon is described. When executed by a surrogate model computing (SMC) device including at least one processor in communication with a database, the computer-executable instructions cause the SMC device to receive, from a user computing device, a workflow request, determine at least one application in the database required to complete the workflow request, retrieve, from the database, the at least one application and meta-data associated with the at least one application, and determine that a user has proper tenancies to use the at least one application. The computer-executable instructions further cause the SMC device to execute, using the at least one application on an external computing device, a workflow associated with the workflow request based at least in part on the meta-data, generate, based on execution of the workflow request, new meta-data associated with the at least one application, and transmit the new meta-data to the database.

DETAILED DESCRIPTION

Figure 1:
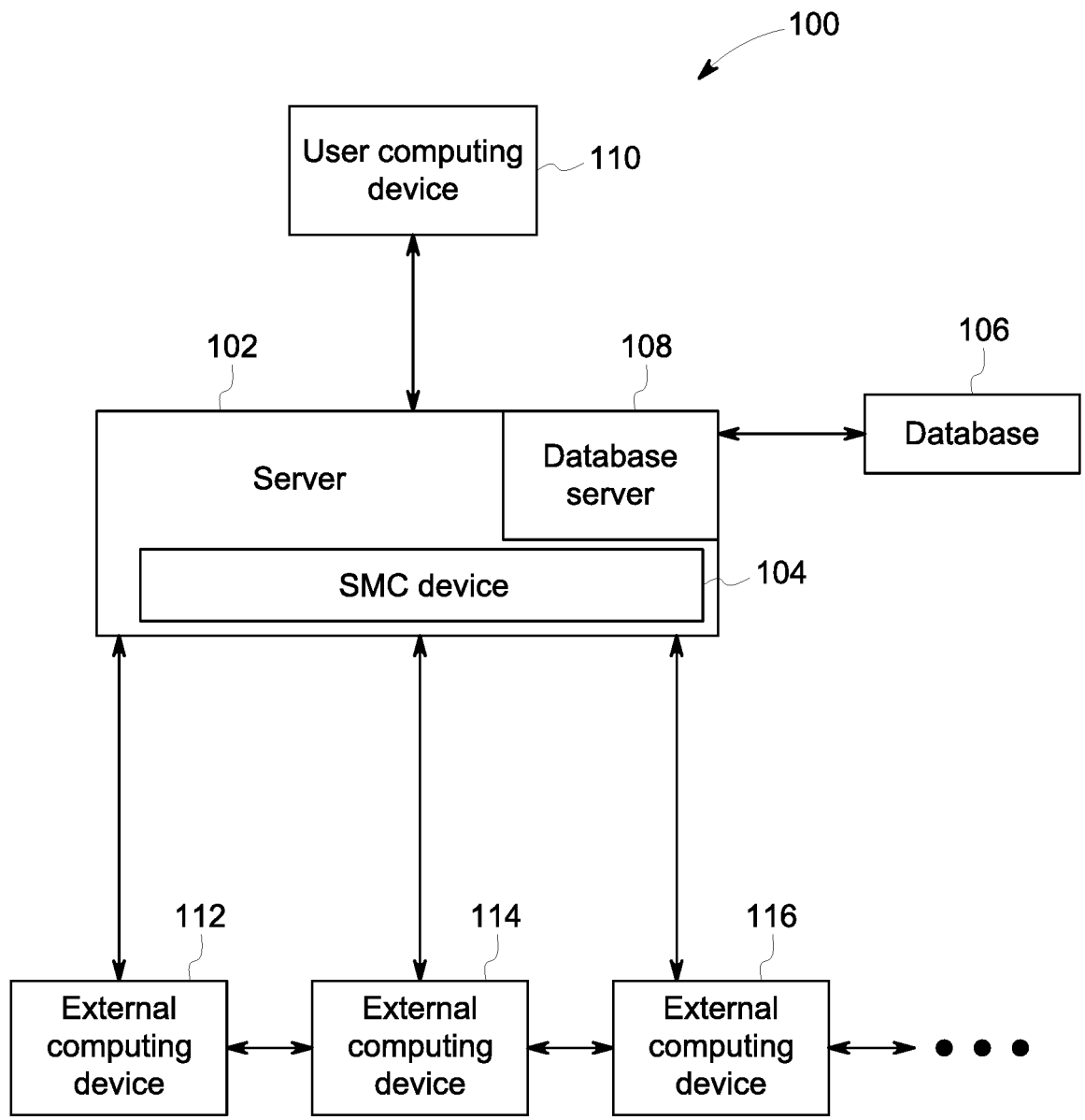
FIG. 1 is a schematic diagram illustrating an example surrogate model computing (SMC) system.

This written description uses examples to disclose embodiments, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The resulting technical effects achieved by the systems and methods of the disclosure include at least one of: (a) automating and learning from use of applications requiring contextual awareness of the libraries, configurations, and underlying operating environment associated with proper installation of the application; (b) automatically configuring computing devices executing workflows requiring usage of various applications to accommodate the various applications; (c) removing the labor-intensive process of configuring the computing environment, configuration of licenses, and discernment of access requirements or restrictions on the licenses; (d) automatically configuring a computing environment before a workflow is executed; and (e) configuring applications such that they are modifiable and reusable to execute other workflows.

As used herein, an element or step recited in the singular and preceded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

As used herein, the term "database" may refer to either a body of data, a relational database management system (RDBMS), or to both. A database may include any collection of data including hierarchical databases, relational databases, flat file databases, object-relational databases, object oriented databases, and any other structured collection of records or data that is stored in a computer system. The above examples are for example only, and thus, are not intended to limit in any way the definition or meaning of the term database. Examples of RDBMS's include, but are not limited to including, Oracle® Database, MySQL, IBM® DB2, Microsoft® SQL Server, Sybase®, and PostgreSQL. However, any database implementation (e.g., relational, document-based) may be used that enables the system and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.).

The term processor, as used herein, may refer to central processing units, microprocessors, microcontrollers, reduced instruction set circuits (RISC), application specific integrated circuits (ASIC), logic circuits, and any other circuit or processor capable of executing the functions described herein.

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are for example only, and are thus not limiting as to the types of memory usable for storage of a computer program.

As used herein, the phrase "surrogate model" may refer to a simulation model that results when any data analytic or regression technique is applied to training data that was generated by a traditional "physics-based model" simulation. Machine learning is one classification of a regression technique that may be used to generate surrogate models. As used herein, "physics-based model" might refer to, for example, a model where first principal equations (and subsequent derivations based on them) are applied to solve an engineering problem of relevance. The physics-based model might be as simple as a spreadsheet calculator or as complex as a massively parallel computational fluid dynamics problem. Note that the phrase "physics-based model" might refer to any physics-based model or tool chain. For example, a workflow might include geometry generation, followed by mesh generation, followed by pre-processing, followed by a physics-based solution, followed by post-processing, followed by a figure-of-merit output (that is, the workflow may represent more than simply a Computational Fluid Dynamics ("CFD") solution).

Problems in the field of using digital models include a labor-intensive process used to manually configure computing environments such that workflows, and applications thereof, may be executed properly. Because of the largely-manual process described above, an individual's preferences are incorporated in the computing environments, workflows, and applications. Because of individual preferences being incorporated, a different individual desiring to use a similar computing environment, workflow, or application may not be able to use the previously created computing environment, workflow, or application. To solve these problems, the systems and methods described herein describe a database for use in conjunction with a machine learning process and computer system such that computing environments, workflows, and applications can be re-used by other qualified individuals, and such that data and meta-data associated with the computing environments, workflows, and applications can be generated and used to make future execution of workflows and applications in varying computing environments more efficient in terms of at least time, cost, and computing resources used.

FIG. 1 is a schematic diagram illustrating an example surrogate model computing (SMC) system 100 for storing applications, accumulating data regarding application usage, and creating surrogate models of workflows using the applications.

SMC system 100 includes a server 102, including at least one SMC device 104 and a database server 108. SMC device 104 is in communication with at least one database 106, at least one user computing device 110, and at least one external computing device 112, 114, 116.

In the example embodiment, user computing device 110 (e.g., a smartphone, tablet, laptop, etc.) is configured to receive user inputs from a user requesting a workflow be completed. A workflow may include a use of any number of applications in order to produce an output from input parameters (e.g., Computer Aided Design ("CAD") geometric parameters, post-processing, etc.). Applications may include, for example, shims, scripts, physics-based models (e.g., an airflow model, a heat transfer model, a thermal distribution model, a material properties model, a mechanical load model, etc.), big data analytic tools, machine learning surrogate model training frameworks, and post-processing and visualization systems. To complete a workflow, some applications may need to be used in series or in parallel to one another on a plurality of external computing devices 112-116. In some embodiments, only one application on one external computing device 112-116 may be required to complete a workflow.

External computing devices 112-116 are configured to run one or more applications to complete a workflow. External computing devices 112-116 are configured to run in series or parallel to complete a workflow, wherein an output from one or multiple external computing devices 112-116 may be an input to another external computing device 112-116.

Database server 108 may be in communication with database 106. Database 106 is configured to store information on a variety of matters, as described below in greater detail. In one embodiment, database 106 is stored on server 102 and may be accessed by logging onto server 102 or SMC device 104 through user computing device 110. In another embodiment, database 106 may be stored remotely from server 102 and may be non-centralized. In some embodiments, database 106 may be local to an external computing device 112-116, distributed across a plurality of locations (e.g., external computing devices 112-116, server 102, database 106, etc.), or exist in a cloud environment.

Figure 2:
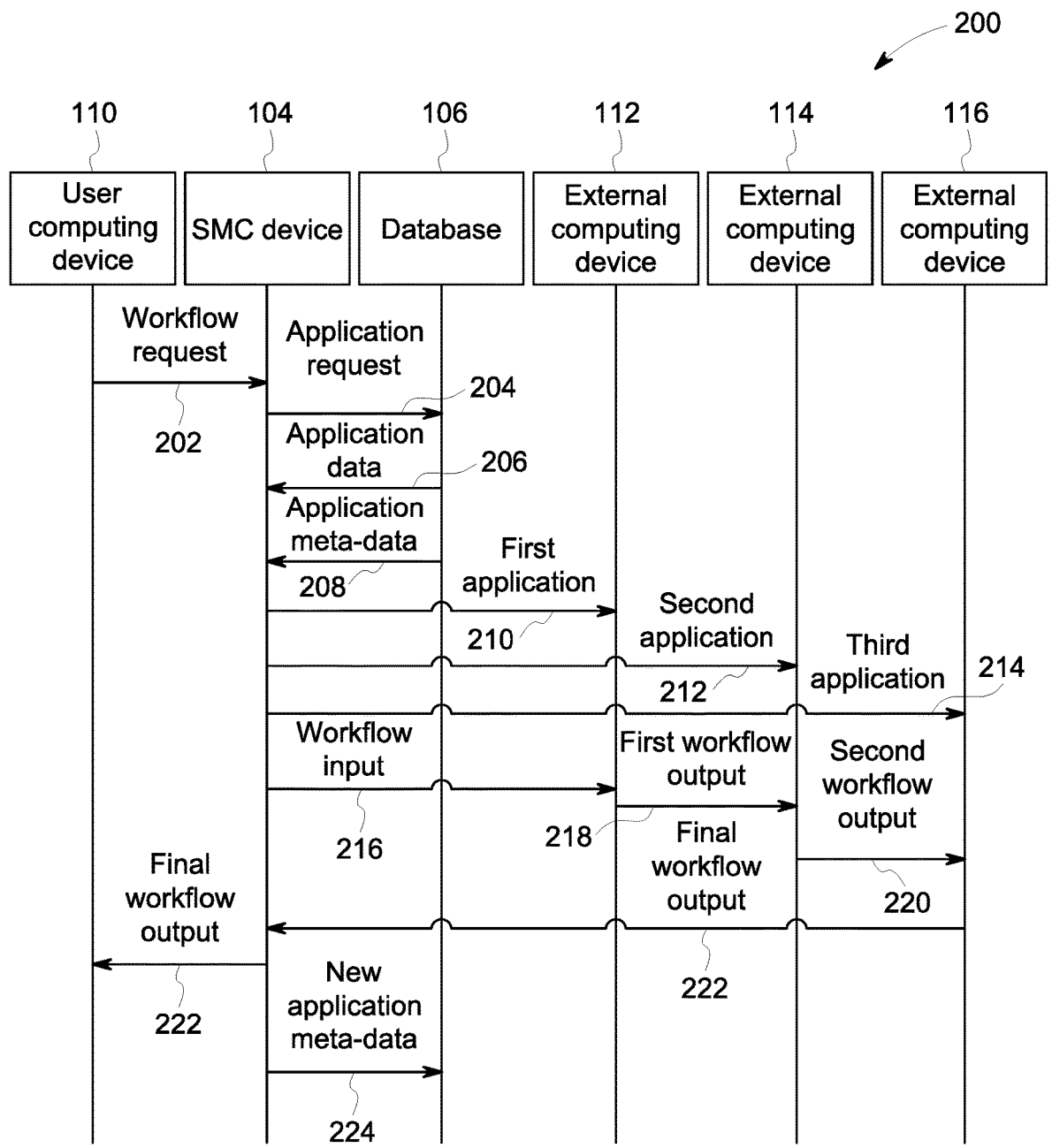
FIG. 2 is a diagram of an example data flow illustrating the generation and execution of a workflow, as implemented using the SMC system shown in FIG. 1.

FIG. 2 is an example data flow diagram illustrating the generation and execution of a workflow, as implemented using SMC system 100, shown in FIG. 1.

In the example embodiment, SMC device 104 is configured to receive a workflow request 202 from user computing device 110. Workflow request 202 may include a workflow input 216, such as data to be used as an input to one or more external computing devices 112-116. In some embodiments, a user may include in workflow request 202 an indication of applications required to complete the requested workflow. In other embodiments, SMC device 104 may be configured to determine the applications required to complete the requested workflow. In some embodiments, a user may be able to search database 106, via SMC device 104 and user computing device 110, to search database 106 for applications to use to complete a workflow. Applications stored in database 106 are easily searchable because of meta-data associated with the applications, as is described below. In some embodiments, SMC device 104 may be configured to recommend applications to be used in a workflow, based at least in part on meta-data associated with the applications. In further embodiments, upon a user search of database 106, search results may only offer a user access to applications that the searching user has the proper tenancies, or permissions, to use, as is described below.

Upon determining the applications required to complete the requested workflow, SMC device 104 is configured to determine if the user requesting completion of the workflow has the proper tenancies to use the required applications. In some embodiments, SMC device 104 may be configured to determine that the user requesting completion of the workflow does not have any anti-tenancies (i.e., tenancies indicating the user is not permitted to use an application) associated with the required applications. In some embodiments, tenancies may include anti-tenancies as described above (e.g., SMC device 104 determination of tenancies also includes SMC device 104 determination of anti-tenancies). In the example embodiment, SMC device 104 is configured to determine the tenancies or anti-tenancies by comparing tenancy data associated with the requested applications stored in database 106 with user-tenancy data received from user computing device 110 in workflow request 202. In some embodiments, the application tenancies or anti-tenancies may be stored in database 106 as meta-data associated with one or more applications.

In some embodiments, at least one of external computing devices 112-116 may also be associated with tenancies. In these embodiments, SMC device 104 is also configured to compare user-tenancy data received from user computing device 110 with tenancy or anti-tenancy data associated with at least one of external computing devices 112-116. In some embodiments, the tenancy or anti-tenancy data associated with at least one of external computing devices 112-116 may be stored in database 106. In other embodiments, the tenancy or anti-tenancy data may be stored locally at the associated at least one external computing device 112-116.

After the proper tenancies are determined for the user, SMC device 104 is configured to transmit an application request 204 to database 106 indicating at least one application required to complete the requested workflow. SMC device 104 is also configured to receive application data 206, including a copy of the at least one requested application, and application meta-data 208, including data indicating configurations of external computing devices 112-116 for running the received at least one application. In some embodiments, more than one configuration of an external computing device 112-116 may be acceptable for running an application. In these embodiments, application meta-data 208 may include an indication of which of the acceptable configurations is preferred when more than one configuration is acceptable. In the example embodiment, SMC device 104 is configured to determine configurations of external computing devices 112-116 to run the applications. In other embodiments, each external computing device 112-116 may be configured to determine, using at least application meta-data 208, how each respective computing device 112-116 should be configured to run the applications. The preferred configuration may be determined based on workflow request 202 and a desired final workflow output 222.

In some embodiments, SMC device 104 may be configured to determine a current configuration of external computing devices 112-116, and compare the current configuration of external computing devices 112-116 with a desired configuration of external computing devices 112-116. In these embodiments, SMC device 104 may be configured to store the current (i.e., original, or baseline) configuration of external computing devices 112-116 in database 106, modify the configuration of external computing devices 112-116 to complete the workflow, and, upon completion of the workflow, restore the configuration of external computing devices 112-116 to the original configuration stored in database 106. For example, SMC device 104 may need to use a particular application when executing a workflow. In some embodiments, SMC device 104 may determine if the particular application is already installed on a particular computing resource (e.g., external computing device 112-116). If the application is already installed on a computing resource, SMC device 104 will not need to re-configure the computing resource. If the application is not installed on a computing resource, SMC device 104 is configured to retrieve a copy of the application from database 106, and configure the computing resource to include the copy of the application (e.g., applications 210-214) as part of executing the workflow. Thus, SMC device 104 may utilize some computing resources in their baseline state, and may re-configure some computing resources from their baseline state in order to execute a workflow.

Further, SMC device 104 may be configured to delete, from at least one external computing device 112-116, any data sent from SMC device 104 to the at least one external computing device 112-116 for completing a workflow (i.e. "wiping" the at least one external computing device 112-116). In these embodiments, SMC device 104 may also be configured to determine user and external computing device tenancies or anti-tenancies are such that modifications to external computing devices 112-116 are permitted. In other embodiments, a user may be required to enter a password to establish a user-tenancy that permits modification of at least one external computing device 112-116.

In the example embodiment shown in FIG. 2, three applications are required to complete the requested workflow. Accordingly, copies of a first application 210, a second application 212, and a third application 214 are transmitted from SMC device 104 to external computing devices 112-116 respectively. Transmitted along with copies of the applications 210-214, is meta-data associated with each application 210-214 indicating at least a configuration of each external computing device 112-116 to run the respective application. A workflow input 216, including input data to be used in the first application, is transmitted from SMC device 104 to external computing device 112. The output from the first application is then transmitted from external computing device 112 to external computing device 114 as first workflow output 218. Similarly, the second application is run on first workflow output 218 at external computing device 114, and second workflow output 220 is transmitted from external computing device 114 to external computing device 116. A third application is then run on second workflow output 220 to produce a final workflow output 222 that is transmitted from external computing device 116 to SMC device 104. Final workflow output 222 is then transmitted from SMC device 104 to user computing device 110, thus giving the user an output from their requested workflow.

In the example embodiment, as the different applications are run to execute the requested workflow on external computing devices 112-116, new meta-data is generated regarding the workflow, and stored in the workflow. For example, new meta-data may include data indicating where the application was run (i.e., which external computing device 112-116 was used to run the application), which user requested the application or workflow using the application, how long it took to run the application, which configuration changes were made to the respective external computing device 112-116 to run the application, and which setup or settings files were used to run the application. The new meta-data is stored in the workflow, and SMC device 104 is configured to extract the new meta-data (i.e., new application meta-data 224) from final workflow output 222. SMC device 104 is then configured to transmit the extracted new application meta-data 224 to database 106. In some embodiments a user may be able to modify new application meta-data 224. For example a user may enter meta-data indicating their user experience with the applications or workflow. This user experience meta-data is transmitted from user computing device 110 to SMC device 104, and compiled with new application meta-data 224 by SMC device 104, and stored in database 106.

In some embodiments, an application may not execute properly. In these embodiments, SMC device 104 may recognize the improper execution, and generate meta-data describing the failure and configurations of the external computing devices 112-116 used in the workflow when the failure occurred. This meta-data is compiled with new application meta-data 224 by SMC device 104, and stored in database 106. In these embodiments, SMC device 104 may be configured to constantly monitor use of applications, and recommend best uses or proper configurations of external computing devices 112-116 such that further failures may be prevented.

In some embodiments, new application meta-data 224 may be stored in database 106 as application meta-data 208, thereby editing the original application meta-data 208. In other embodiments, new application meta-data 224 may be stored separately from meta-data 208. In embodiments where new application meta-data 224 is stored as part of application meta-data 208, SMC device 104 may be configured to verify that the application associated with application meta-data 208 still produces the same output as it did with the previous version of application meta-data 208 (i.e., the same output will be produced, even though use of the updated meta-data 208 with the application may produce the same output faster, for instance).

In the example embodiment, use of three different applications and associated application meta-data 208 are described. It should be recognized, however, that the systems and methods described herein may be applied to workflows, shims, or scripts as a whole, used for organizing at least one application, instead of individual applications therein. For example, a workflow may be stored in database 106 with meta-data associated therewith. Thus, instead of requesting, receiving, and configuring external computing devices 112-116 for specific applications within a workflow, SMC device 104 may request, receive, and configure external computing devices 112-116 to execute a workflow as a whole. Accordingly, meta-data will be generated and stored as being associated with the broader workflow, as opposed to with specific applications used therein.

In the example embodiment, SMC device 104 is configured to use data in database 106 to generate surrogate models. One advantage of surrogate models is in their speed. While physics-based models can take a relatively long period of time to execute (e.g., days, weeks, or months), a surrogate model can execute nearly instantaneously (e.g., seconds or minutes) regardless of the complexity of the underlying physics-based model that it reproduces. Further, instead of a user needing to define initial parameters, map inputs and outputs, etc., a trained surrogate model can reproduce an entire space of solution points and is executable by non-experts or by digital models directly. By using data in database 106, including a substantial amount of meta-data associated with applications or workflows stored in database 106 as is described above, SMC device 104 is able to generate surrogate models more efficiently, instead of requiring an extensive amount of input information from a user than can take a substantial amount of time.

Figure 3:
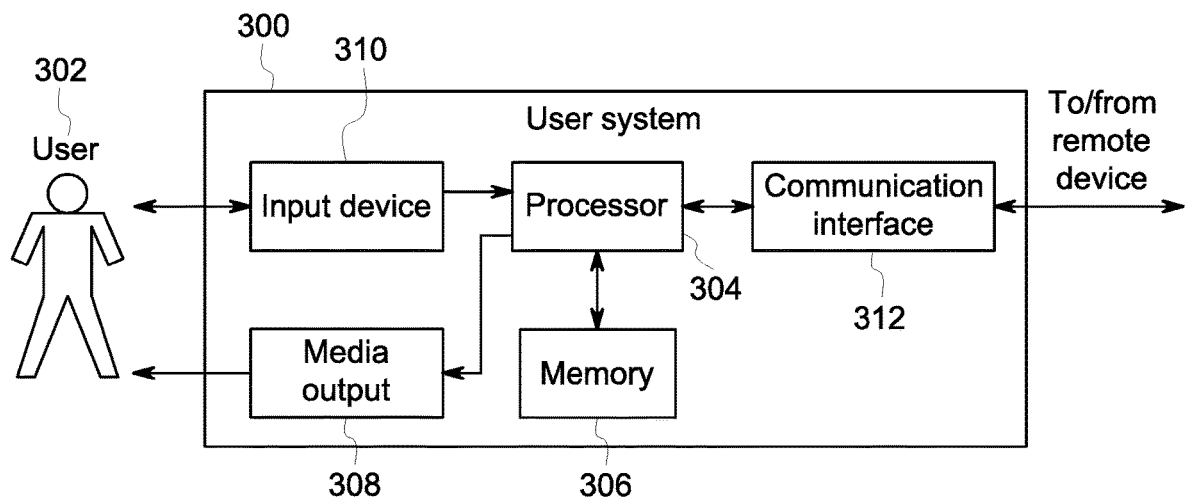
FIG. 3 is a block diagram of an example user computing device for use with the SMC system shown in FIG. 1.

FIG. 3 illustrates an example configuration of a user system 300 that may be operated by a user 302. In some embodiments, user system 300 implements user computing device 110 (shown in FIG. 1), and may be used by user 302 to interact with SMC device 104 (also shown in FIG. 1). More specifically, user system 300 may be used by user 302, for example, to transmit workflow request 202 and receive final workflow output 222 (both shown in FIG. 2). In the example embodiment, user system 300 includes a processor 304 for executing instructions. In some embodiments, executable instructions are stored in a memory area 306. Processor 304 may include one or more processing units, for example, a multi-core configuration. Memory area 306 may include one or more non-transient computer readable media.

User system 300 also includes at least one media output component 308 for presenting information to user 302, such as for example, final workflow output 222. Media output component 308 is any component capable of conveying information to user 302. In some embodiments, media output component includes an output adapter such as a video adapter or audio adapter. An output adapter is operatively coupled to processor 304 and operatively couplable to an output device such as a display device, a liquid crystal display (LCD), organic light emitting diode (OLED) display, or "electronic ink" display, or an audio output device, a speaker or headphones.

In some embodiments, user system 300 includes an input device 310 for receiving input from user 302. Input device 310 may include, for example, a keyboard, a pointing device, a mouse, a stylus, a touch sensitive panel, a touch pad, a touch screen, a gyroscope, an accelerometer, a position detector, or an audio input device. A single component such as a touch screen may function as both an output device of media output component 308 and input device 310. User system 300 may also include a communication interface 312 communicatively couplable to a remote device, such as SMC device 104. Communication interface 312 may include, for example, a wired or wireless network adapter or a wireless data transceiver for use with a mobile phone network, Global System for Mobile communications (GSM), 3G, or other mobile data network or Worldwide Interoperability for Microwave Access (WIMAX).

Stored in memory area 306 are, for example, computer readable instructions for providing a user interface to user 302 via media output component 308 and, optionally, receiving and processing input from input device 310. A user interface may include, among other possibilities, a web browser and client application. Web browsers enable users, such as user 302, to display and interact with media and other information typically embedded on a web page or a website from SMC system 100. A client application may allow user 302 to interact with a server application from SMC system 100.

Figure 4:
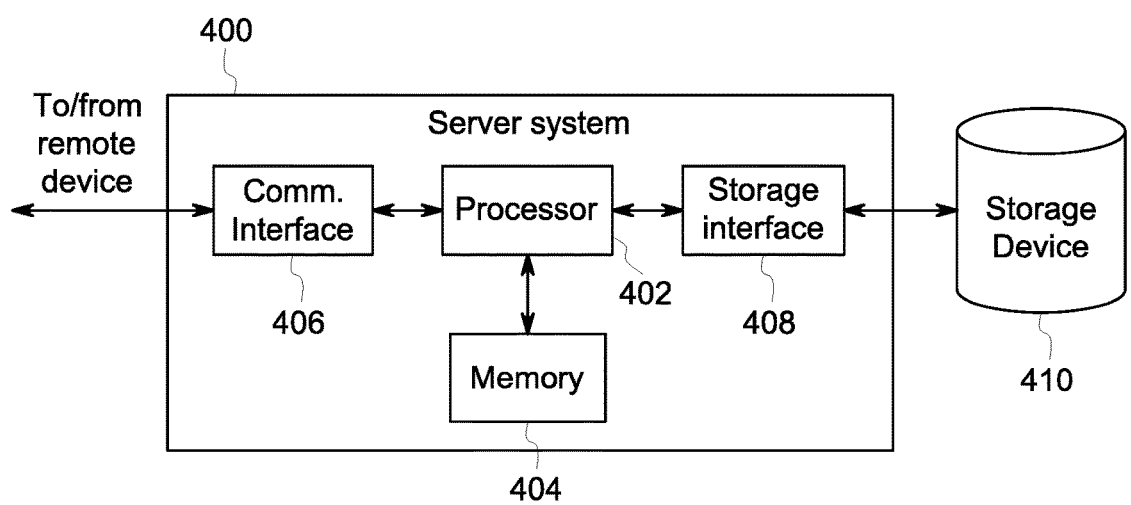
FIG. 4 is a block diagram of an example server computing device for use with the SMC system shown in FIG. 1.

FIG. 4 illustrates an example configuration of a server system 400. Server system 400 may include, but is not limited to, SMC device 104 (shown in FIG. 1). Server system 400 includes a processor 402 for executing instructions. Instructions, or a computer program, may be stored in a memory area 404, for example. Processor 402 may include one or more processing units (e.g., in a multi-core configuration) for executing instructions. The instructions may be executed within a variety of different operating systems on server system 400, such as UNIX, LINUX, Microsoft Windows®, etc. Upon initiation of a computer-based method, various instructions may be executed during initialization. Some operations may be required to perform one or more processes described herein, while other operations may be more general or specific to a particular programming language (e.g., C, C#, C++, Java, or other suitable programming languages, etc.).

Processor 402 is operatively coupled to a communication interface 406 such that server system 400 is capable of communicating with a remote device such as user system 300 (shown in FIG. 3) or another server system 400. For example, communication interface 406 may receive requests from user computing device 110 via the Internet.

Processor 402 may also be operatively coupled to a storage device 410. Storage device 410 is any computer-operated hardware suitable for storing or retrieving data. In some embodiments, storage device 410 is integrated in server system 400. For example, server system 400 may include one or more hard disk drives as storage device 410. In other embodiments, storage device 410 is external to server system 400 and may be accessed by a plurality of server systems 400. For example, storage device 410 may include multiple storage units such as hard disks or solid state disks in a redundant array of inexpensive disks (RAID) configuration. Storage device 410 may include a storage area network (SAN) or a network attached storage (NAS) system.

In some embodiments, processor 402 is operatively coupled to storage device 410 via a storage interface 408. Storage interface 408 is any component capable of providing processor 402 with access to storage device 410. Storage interface 408 may include, for example, an Advanced Technology Attachment (ATA) adapter, a Serial ATA (SATA) adapter, a Small Computer System Interface (SCSI) adapter, a RAID controller, a SAN adapter, a network adapter, or any other component providing processor 402 with access to storage device 410.

Memory area 404 may include, but is not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only, and are thus not limiting as to the types of memory usable for storage of instructions, or a computer program.

Figure 5:
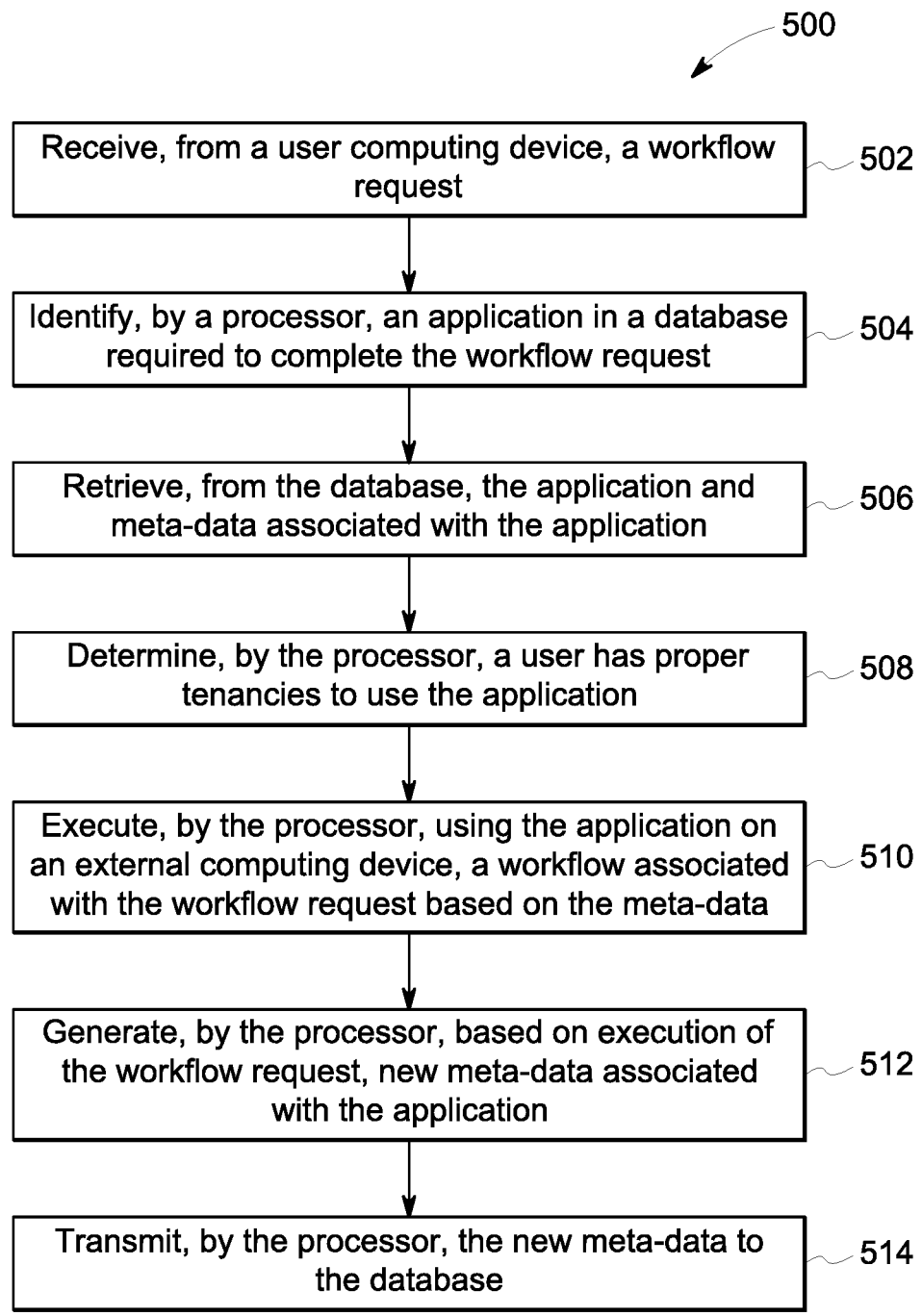
FIG. 5 is a flow diagram of an example method for creating surrogate models.

FIG. 5 is a flow chart of an example method 500 for creating surrogate models.

Method 500 includes receiving 502 from a user computing device (e.g., user computing device 110), a workflow request and identifying 504, by a processor, at least one application in a database (e.g., database 106) required to complete the workflow request.

Method 500 further includes retrieving 506 from database 106 the at least one application and meta-data associated with the at least one application and determining 508, by the processer, that a user has proper tenancies to use the at least one application. Method 500 also includes executing 510 by the processor, using the at least one application on an external computing device (e.g., external computing devices 112-116), a workflow associated with the workflow request based at least in part on the meta-data.

Method 500 yet further includes generating 512, by the processor, based on execution of the workflow request, new meta-data associated with the at least one application and transmitting 514, by the processor, the new meta-data to database 106.

In some embodiments method 500 includes determining a user has proper tenancies to use an external computing device or, when the meta-data includes a plurality of configuration options for executing 510 the at least one application, determining based on the workflow request, one configuration of a plurality of configuration options for executing the at least one application to be used while executing 510 the workflow.

In some embodiments, determining 508 that the user has proper tenancies to use the at least one application is based at least in part on meta-data associated with the application. In further embodiments of method 500, database 106 may be a cloud-based database while in other embodiments of method 500 database 106 may be local to the computing system.

Exemplary embodiments of systems and methods for creating surrogate models of industrial assets are described above in detail. The systems and methods are not limited to the specific embodiments described herein but, rather, components of the systems or operations of the methods may be utilized independently and separately from other components or operations described herein. Further, the described components or operations may also be defined in, or used in combination with, other systems, methods, or devices, and are not limited to practice with only the systems described herein.

A processor or a processing element may employ artificial intelligence or be trained using supervised or unsupervised machine learning, and the machine learning program may employ a neural network that may be a convolutional neural network, a deep learning neural network, or a combined learning module or program that learns in two or more fields or areas of interest. Machine learning may involve identifying and recognizing patterns in existing data in order to facilitate making predictions for subsequent data. Models may be created based upon example inputs in order to make valid and reliable predictions for novel inputs.

Additionally or alternatively, the machine learning programs may be trained by inputting sample data sets or certain data into the programs, such as image data, text data, report data, or numerical analysis. The machine learning programs may utilize deep learning algorithms that may be primarily focused on pattern recognition, and may be trained after processing multiple examples. The machine learning programs may include Bayesian program learning (BPL), voice recognition and synthesis, image or object recognition, optical character recognition, or natural language processing—either individually or in combination. The machine learning programs may also include natural language processing, semantic analysis, automatic reasoning, or machine learning.

In supervised machine learning, a processing element may be provided with example inputs and their associated outputs, and may seek to discover a general rule that maps inputs to outputs, so that when subsequent novel inputs are provided the processing element may, based upon the discovered rule, accurately predict the correct output. In unsupervised machine learning, the processing element may be required to find its own structure in unlabeled example inputs. In one embodiment, machine learning techniques may be used to extract data about the computer device, the user of the computer device, the computer network hosting the computer device, services executing on the computer device, or other data.

Based upon these analyses, the processing element may learn how to identify characteristics and patterns that may then be applied to training models, analyzing sensor data, and detecting abnormalities.

As will be appreciated based upon the foregoing specification, the above-described embodiments of the disclosure may be implemented using computer programming or engineering techniques including computer software, firmware, hardware or any combination or subset thereof. Any such resulting program, having computer-readable code means, may be embodied or provided within one or more computer-readable media, thereby making a computer program product, i.e., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), or any transmitting/receiving medium, such as the Internet or other communication network or link. The article of manufacture containing the computer code may be made or used by executing the code directly from one medium, by copying the code from one medium to another medium, or by transmitting the code over a network.

These computer programs (also known as programs, software, software applications, "apps," or code) include machine instructions for a programmable processor, and can be implemented in a high-level procedural or object-oriented programming language, or in assembly/machine language. As used herein, the terms "machine-readable medium" and "computer-readable medium" refer to any computer program product, apparatus or device (e.g., magnetic discs, optical disks, memory, Programmable Logic Devices (PLDs)) used to provide machine instructions or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions or data to a programmable processor.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition or meaning of the term "processor."

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

In some embodiments, the system includes multiple components distributed among a plurality of computer devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes. The present embodiments may enhance the functionality and functioning of computers or computer systems.

As used herein, an element or step recited in the singular and preceded by the word "a" or "an" should be understood as not excluding plural elements or steps, unless such exclusion is explicitly recited. Furthermore, references to "example embodiment," "exemplary embodiment," or "one embodiment" of the present disclosure are not intended to be interpreted as excluding the existence of additional embodiments that also incorporate the recited features.

The patent claims at the end of this document are not intended to be construed under 35 U.S.C. § 112(f) unless traditional means-plus-function language is expressly recited, such as "means for" or "step for" language being expressly recited in the claim(s).

Although specific features of various embodiments of the invention may be shown in some drawings and not in others, this is for convenience only. In accordance with the principles of the invention, any feature of a drawing may be referenced or claimed in combination with any feature of any other drawing.

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A surrogate model computing (SMC) system comprising:

a user computing device comprising a user interface;

a database; and a processor communicatively coupled to said user computing device and said database, said processor executing instructions that cause said processor to:
receive, from said user computing device, a workflow request;
identify an application in said database required to complete the workflow request;
retrieve, from said database, the application and meta-data associated with the application;
determine that a user has proper tenancies to use the application;
store a pre-workflow configuration of an external computing device;
configure the external computing device from the pre-workflow configuration to a workflow configuration for execution of a workflow associated with the workflow request based on the meta-data;
execute, using the application on the external computing device while the external computing device is in the workflow configuration, the workflow;
re-configure the external computing device to the pre-workflow configuration upon completion of the workflow;
generate, based on execution of the workflow request, new meta-data associated with the application;
receive, from said user computing device, feedback regarding execution of the workflow request;
include the feedback in the new meta-data; and
transmit the new meta-data to said database.

2. The SMC system of claim 1 wherein the instructions further cause said processor to:
determine that the user has proper tenancies based on the meta-data associated with the application;
wherein the feedback regarding execution of the workflow request includes user experience of the user during the execution of the workflow request.

3. The SMC system of claim 1 wherein the instructions further cause said processor to determine that the user has proper tenancies to use the external computing device.

4. The SMC system of claim 1 wherein said database comprises a cloud-based database.

5. The SMC system of claim 1 wherein said database comprises a database local to said SMC system.

6. The SMC system of claim 1 wherein the meta-data includes a plurality of configuration options for executing the application.

7. The SMC system of claim 6 wherein the instructions further cause said processor, based on the workflow request, to:
determine one configuration, of the plurality of configuration options for executing the application, to use while executing the workflow; and
determine the pre-workflow configuration of the external computing device.

8. A computer-implemented method of creating surrogate models using a surrogate model computing (SMC) system that includes a processor communicatively coupled to a database, said method comprising:
receiving, from a user computing device, a workflow request;
identifying, by the processor, an application in the database required to complete the workflow request;
retrieving, from the database, the application and meta-data associated with the application;
determining, by the processor, that a user has proper tenancies to use the application;
storing, by the processor, a pre-workflow configuration of an external computing device;
configuring, by the processor, the external computing device from the pre-workflow configuration to a workflow configuration for execution of a workflow associated with the workflow request based on the meta-data;
executing, by the processor, using the application on the external computing device while the external computing device is in the workflow configuration, the workflow;
re-configuring, by the processor, the external computing device to the pre-workflow configuration upon completion of the workflow;
generating, by the processor, based on execution of the workflow request, new meta-data associated with the application;
receiving, from said user computing device, feedback regarding execution of the workflow request;
including, by the processor, the feedback in the new meta-data; and
transmitting, by the processor, the new meta-data to the database.

9. The computer-implemented method of claim 8, further comprising:
determining, by the processor, that the user has proper tenancies to use the application based on the meta-data associated with the application;
wherein the feedback regarding execution of the workflow request includes user experience of the user during the execution of the workflow request.

10. The computer-implemented method of claim 8 further comprising determining that the user has proper tenancies to use the external computing device.

11. The computer-implemented method of claim 8 further comprising retrieving, from the database, the application and meta-data associated with the application, wherein the database comprises a cloud-based database.

12. The computer-implemented method of claim 8 further comprising retrieving, from the database, the application and meta-data associated with the application, wherein the database includes a database local to the SMC system.

13. The computer-implemented method of claim 8 further comprising retrieving, from the database, the application and meta-data associated with the application, wherein the meta-data includes a plurality of configuration options for executing the application.

14. The computer-implemented method of claim 13 further comprising:
determining, by the processor and based on the workflow request, one configuration of the plurality of configuration options for executing the application to be used while executing the workflow; and
determining, by the processor, the pre-workflow configuration of the external computing device.

15. A non-transitory computer-readable storage media having computer-executable instructions embodied thereon, wherein when executed by a surrogate model computing (SMC) device comprising at least one processor in communication with a database, the computer-executable instructions cause the SMC device to:
receive, from a user computing device, a workflow request;
identify an application in the database required to complete the workflow request;
retrieve, from the database, the application and meta-data associated with the application;

determine that a user has proper tenancies to use the application;
store a pre-workflow configuration of an external computing device;
configure the external computing device from the pre-workflow configuration to a workflow configuration for execution of a workflow associated with the workflow request based on the meta-data;
execute, using the application on the external computing device while the external computing device is in the workflow configuration, the workflow;
re-configure the external computing device to the pre-workflow configuration upon completion of the workflow;
generate, based on execution of the workflow request, new meta-data associated with the application;
receive, from said user computing device, feedback regarding execution of the workflow request;
include the feedback in the new meta-data; and
transmit the new meta-data to the database.

16. The non-transitory computer-readable storage media of claim 15, wherein the computer-executable instructions further cause the SMC device to:
determine that the user has proper tenancies to use the application based on the meta-data associated with the application;
wherein the feedback regarding execution of the workflow request includes user experience of the user during the execution of the workflow request.

17. The non-transitory computer-readable storage media of claim 15, wherein the computer-executable instructions further cause the SMC device to determine that the user has proper tenancies to use the external computing device.

18. The non-transitory computer-readable storage media of claim 15, wherein the computer-executable instructions further cause the SMC device to retrieve, from the database, the application and meta-data associated with the application, wherein the database comprises a cloud-based database.

19. The non-transitory computer-readable storage media of claim 15, wherein the computer-executable instructions further cause the SMC device to retrieve, from the database, the application and meta-data associated with the application, wherein the meta-data includes a plurality of configuration options for executing the application.

20. The non-transitory computer-readable storage media of claim 19, wherein the computer-executable instructions further cause the SMC device, based on the workflow request, to:
determine one configuration, of the plurality of configuration options for executing the application, to use while executing the workflow; and
determine the pre-workflow configuration of the external computing device.

* * * * *